United States Patent [19]

Mayer et al.

[11] 4,116,185
[45] Sep. 26, 1978

[54] RADIAL CARBURETOR

[75] Inventors: Endre A. Mayer, Birmingham; Charles R. Kelso, Farmington Hills, both of Mich.

[73] Assignee: The Bendix Corporation, Southfield, Mich.

[21] Appl. No.: 752,377

[22] Filed: Dec. 20, 1976

[51] Int. Cl.² .................. F02M 27/08; F02B 33/00
[52] U.S. Cl. .................. 123/139 AW; 123/119 DB; 123/119 R; 261/59; 261/79 R
[58] Field of Search ........... 123/139 AW, 119 R, 141, 123/119 D, 119 DB, 131, 32 EB; 261/59, 50 R, 116, DIG. 39, 52, 69 R, 32

[56] References Cited

U.S. PATENT DOCUMENTS

| 795,273 | 7/1905 | Essner | 123/119 D |
|---|---|---|---|
| 954,507 | 4/1910 | Fogler | 123/119 D |
| 970,251 | 9/1910 | Martha | 123/119 D |
| 1,097,311 | 5/1914 | Gottschalk | 123/119 DB |
| 1,137,727 | 5/1915 | Abernethy | 261/59 |
| 1,211,714 | 1/1917 | Kirbach et al. | 261/32 |
| 1,223,670 | 4/1917 | Collins | 123/119 DB |
| 1,290,195 | 1/1919 | Hodgrins et al. | 123/119 DB |
| 2,251,999 | 8/1941 | Greco | 123/141 |
| 2,378,864 | 3/1944 | Rascov | 261/59 |
| 2,580,384 | 1/1952 | Hazen et al. | 261/59 |
| 2,701,557 | 2/1955 | Ramey | 123/141 |
| 3,269,658 | 8/1966 | Gerquest | 261/50 R |
| 3,529,809 | 9/1970 | Von Seld | 261/50 R |
| 3,685,808 | 8/1972 | Bodai | 261/DIG. 39 |
| 3,877,449 | 4/1975 | High | 123/119 R |
| 4,031,866 | 6/1977 | Asano | 123/32 EB |

Primary Examiner—Charles J. Myhre
Assistant Examiner—R. A. Nelli
Attorney, Agent, or Firm—James R. Ignatowski; Russel C. Wells

[57] ABSTRACT

Disclosed herein is a carburetor for an internal combustion engine embodying a novel air control valve in which the air is admitted from a plurality of radially disposed apertures. Air flow is controlled by a like plurality of movable shutters attached to a movable cage assembly circumscribing the carburetor housing. The carburetor also embodies vacuum valves which generate vacuum signals for the engine's spark advance and exhaust gas recirculating mechanisms as a function of the engine's manifold vacuum and the position of the cage assembly. In the preferred embodiment, the cage assembly is a rotary cage.

25 Claims, 20 Drawing Figures

RADIAL CARBURETOR

BACKGROUND OF THE INVENTION

1. Field of the Invention

The invention is directed to an air control valve, and in particular, to a carburetor for an internal combustion engine embodying novel air control and vacuum valves controlling the air flow to the engine and providing vacuum signals controlling the operation of one or more accessories.

2. Background of the Invention

Various types of air control valves and carburation means have been used for supplying a controlled quantity of an air/fuel mixture to an internal combustion engine. The most commonly used today embodies a butterfly type valve in the throat of a generally cylindrical passageway for controlling the primary air flow in response to an operator's command. A venturi located upstream of the butterfly valve creates a low pressure region which asperates fuel into the engine's intake manifold. With the advent of electronic fuel control and its attendent fuel injection systems, the need for the venturi section of the present carburetor systems has been eliminated. However, the butterfly valve for controlling the air flow has for the most part survived the transition as a means for controlling the air flow. Probably, the main reasons for the survival of the butterfly valve is its extreme simplicity, ease of manufacture and its characteristics are well known. The disadvantages of the butterfly valve is that the resultant air flow in the immediate vicinity of the valve is unsymmetrical, particularly when the valve angle is small, less than thirty degrees. This unsymmetrical air flow perturbates the air/fuel distribution in the engine's intake manifold. With the present emphasis on emissions control and fuel economy, this perturbation of the air/fuel distribution increases both fuel consumption and the emissions of undesirable exhaust gases.

Another factor which also has become important is the generation of the vacuum signals which operate vacuum motors controlling peripheral accessories of the engine, which also play a part in the emissions and economy of the engine. Of primary importance today are the engine's spark or ignition advance system and the exhaust recirculation valve. For the most efficient operation of the engine, the air flow and, therefore, the setting of the valves control member at which these peripheral devices are actuated, needs to be controlled with a fair degree of precision. Unfortunately, the butterfly valve configuration is not well suited for generating these vacuum signals with the degree of precision desired.

Alternate approaches to the butterfly valve for controlling the air flow to an internal combustion engine have been disclosed in the prior art. Typical examples of these are U.S. Pat. No. 795,273 issued to L. A. Essner (1905) and 1,238,433 issued to B. Pendersen (1917). Both of these patents teach concentric discs, each having one or more mating apertures. Rotating the discs relative to each other increases and decreases the effective aperture formed by the mating apertures. A similar type valve is also shown in U.S. Pat. No. 1,797,293 issued to J. H. McSlvaine for controlling the air flow of a centrifugal fan. Another variation is shown in U.S. Pat. No. 3,934,564 issued to Barnert in 1976, as applied to an exhaust gas recirculation valve.

Disclosed herein is a carburetor embodying an air control valve which overcomes the disadvantages of the butterfly valve and other air control valves of the prior art and is capable of generating the desired vacuum signals.

SUMMARY OF THE INVENTION

The invention is a carburetor for an internal combustion engine embodying a novel radial air control valve having valve members for generating the desired vacuum signals. The carburetor comprises: a housing having a plurality of peripheral apertures admitting air symmetrically to the inside of the housing; a cage circumscribing the housing actuated in response to an operator's control; a like plurality of shutters attached to the cage controlling the effective open area of the housing's apertures as a function of the physical displacement of the cage; at least one valve member also attached to said cage generating vacuum signals as a function of the air pressure inside the carburetor and the position of the cage; and an air assisted fuel atomizer, having a fuel control valve for supplying an atomized air/fuel mixture.

The object of the invention is a carburetor supplying a uniformly distributed air/fuel mixture to an internal combustion engine.

Another object of the invention is a carburetor having a radial air control valve providing a uniformly distributed air/fuel supply to the engine.

A still further objective of the invention is a carburetor having valve means for providing vacuum signals for the actuation of engine accessories at predetermined angular positions of the radial air control valve.

A final object of the invention is a carburetor having a centrally disposed air assisted fuel atomizer.

These and other objects of the invention will become apparent from a reading of the drawings and a reading of the detailed description of the invention with reference to the drawings.

DETAILED DESCRIPTION OF THE PREFERRED EMBODIMENT

Figures 1, 4:
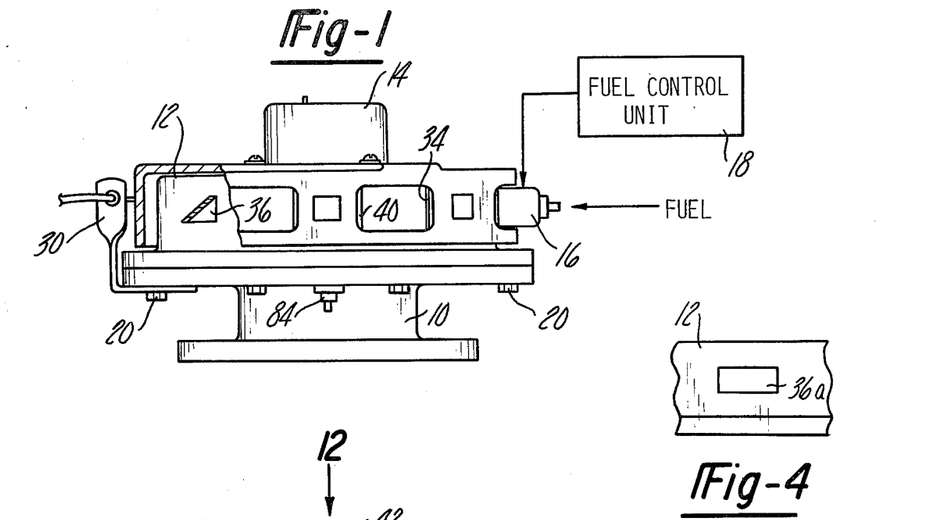
FIG. 1 is a side view of the radial carburetor.
FIG. 4 is a side view of the housing showing an alternate aperture configuration.
Figures 2, 5, 6:
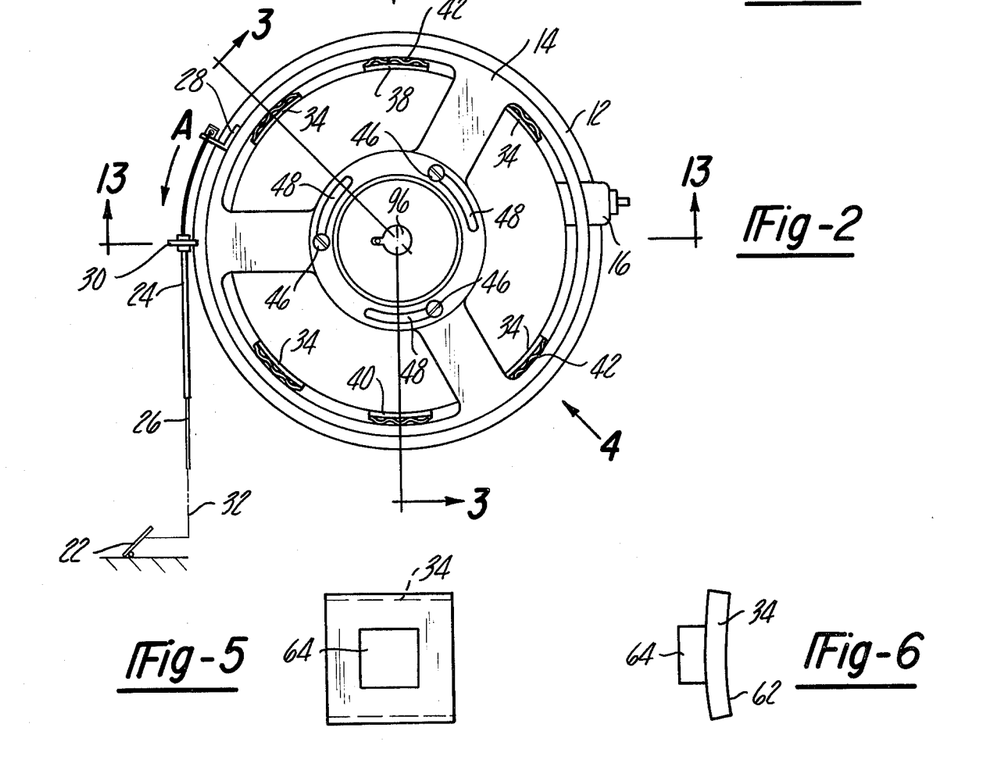
FIG. 2 is a top view of the radial carburetor.
FIG. 5 is a front view of the shutter.
FIG. 6 is a side view of the shutter.

The preferred embodiment of the disclosed carburetor is illustrated in FIGS. 1 and 2. The carburetor comprises a base 10 to which is mounted a bell housing 12. A rotary cage 14 is rotably disposed from the top of and circumscribes said housing 12. Fuel is supplied to the carburetor by means of a fuel control valve 16 delivering fuel to the carburetor in response to the signals generated by a fuel control unit 18. The fuel control valve 16 receives fuel from a source (not shown) which in a conventional automotive application would include a fuel tank, a fuel pump and a pressure regulator as commonly used. The fuel control unit 18 may be an electronic control unit generating signals indicative of the engine's fuel requirement or may be a mechanical control, a hydraulic control, or a hybrid thereof, as taught by the art. The housing 12 may be secured to the base 10 by means of fasteners illustrated as a plurality of bolts 20 equally spaced about the periphery of the base, as shown. Alternatively, a "C" clamp or any other means may be used. The rotary cage 14 is activated in response to an operator control illustrated as an accelerator pedal 22. The motion of the accelerator pedal is imparted to a linear actuator cable assembly 24 having a linearly displaceable wire 26. One end of the wire 26 is connected to a retainer bracket 28 fastened to the rotary cage assembly 14, as shown, while the other end may be connected directly to the accelerator pedal 22 of by means of a suitable mechanical linkage. The end of the coaxial cable 24 adjacent to the throttle is secured to the base 10 by means of a support bracket 30. The movement of accelerator pedal 22 is mechanically coupled to the wire 26 by means of a mechanical linkage, illustrated as dashed line 32. Attached to the cage assembly 14 is a plurality of shutters 34 disposed about the periphery of the housing 12 at various locations. The shutters 34 are operative to rotate with the cage 14 and control the open area of a like plurality of apertures 36 formed in the housing 12. Also attached to the cage 14 and operative to rotate therewith, is shown a spark advance valve 38 member and an exhaust gas recirculation (EGR) valve 40 member. The valves 38 and 40 generate vacuum signals indicative of the engine's spark advance and exhaust gas recirculation requirements, respectively. The shutters 34 and the valves 38 and 40 are held firmly against the housing 12 by a resilient member such as wave springs 42. It is understood that the cage 14 may be made from a suitable structural plastic and the shutters 34 and valves 38 and 40 may be formed integral with the cage rather than separate elements, as shown.

Figure 3:
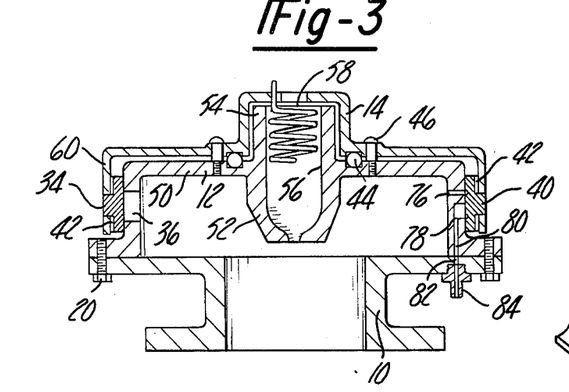
FIG. 3 is a cross sectional view taken along the cross section designated 3—3.

The details of the housing 12, cage 14 and EGR valve member 40 are shown in the cross sectional view of FIG. 3 taken along the pieshaped section lines indicated by 3—3 on FIG. 2. The rotary cage 14 is rotatably supported from housing 12 by means of a rotary bearing 44. The bearing 44 may be a ball bearing, as illustrated, or may be any other type of bearing, such as a plastic ring, providing a relatively frictionless bearing surface between the housing 12 and cage 14. The rotary cage is rotatably captured to the housing 12 by any suitable means, such as a plurality of shoulder bolts 46 screwed into the housing 12 through a like plurality of arcuate slots 48, as shown in FIG. 2, formed in the rotary cage. The cover 50 of housing 12 has an internal boss 52 and a concentric external boss 54. The internal boss 52 forms part of an air assisted fuel atomizer, as we shall describe with reference to FIGS. 4 and 5, and the external boss 54 has an internal cavity 56 which functions as an air passageway and a spring retainer.

A resilient member, such as coil spring 58, is disposed in the cavity 56 of external boss 54 and has one end connected to the housing 12 and the other end connected to the rotary cage 14, as shown. The coil spring 58 produces a force tending to rotate the rotary cage 14 clockwise, as shown in FIG. 2 with respect to the housing 12 maintaining the tension on the wire 26 as the operator's foot pedal is returned to an idle position. The shutters 34 are disposed between a skirt portion 60 of the rotary cage 14 and the housing 12, as shown, and may either completely occlude the aperture 36 or leave a small open area to supplement the idle air flow through the air assisted fuel atomizer when the rotary cage is in the full clockwise or idle position. The shape of the aperture 36 depends upon the dynamic characteristics of the engine and the linkage mechanism 32 between the accelerator pedal 22 and the cage 14. The aperture 36 may have a triangular configuration, as shown in FIG. 1, may be rectangular in shape, as shown by aperture 36a in FIG. 4, or any other shape, as determined, to meet the needs of the engine.

Figure 7:
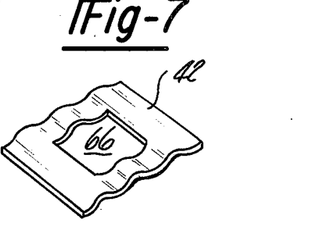
FIG. 7 is a perspective of the wave spring.
Figure 8:
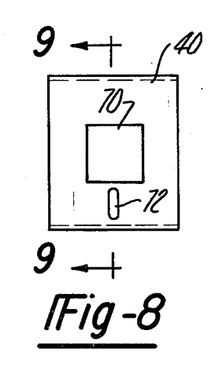
FIG. 8 is a front view of the valve member.
Figure 9:
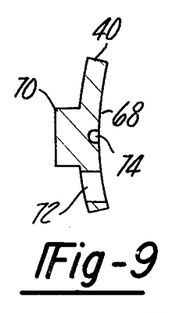
FIG. 9 is a cross sectional view of the valve member 9—9.
Figure 10:
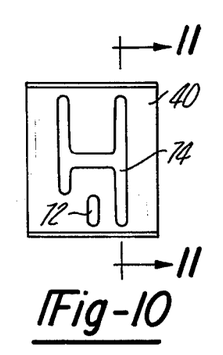
FIG. 10 is a back view of the valve member.
Figure 11:
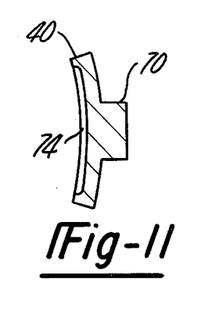
FIG. 11 is a cross sectional view of the valve member 11—11.

The details of the shutters 34 are shown in FIGS. 5 and 6. Each shutter has a concave surface 62 which conforms to the external surfaces of housing 12. A boss 64 is formed on the opposite side of the shutter which slidably fits into a like aperture in the skirt 60. The shutter may be made from a metal or a structural plastic. A wave spring 42, such as shown on FIG. 7, is disposed between the shutters 34 and the skirt 60 of the rotary cage 14 and holds the shutter firmly against the housing 12. The wave spring 42 has a central aperture 66 which permits the boss 64 of the shutters 34 to pass therethrough.

The details of the EGR valve member 40 are shown on FIGS. 8-11. The valve member 40 is generally rectangular in shape and has a concave cylindrical surface 68 conforming the outer surface of housing 12. The valve member 40 also contains a boss 70 which performs the same function as the boss 64 of shutters 34. A relatively short slot 72 is formed through the valve member 40, as shown, and a groove 74 in the form of an obtuse H pattern is formed on the concave cylindrical surface 68.

Figure 12:
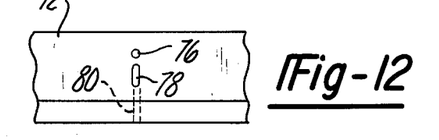
FIG. 12 is a side view of the housing covered by the valve member.

Referring back to FIG. 3, the valve member 40 is disposed between the skirt 60 and the housing 12, as shown. A resilient member, such as wave spring 42, is disposed between the valve member 40 and the skirt 60 urging the valve member firmly against the housing, as discussed with reference to the shutters 34. The short vertical leg of the "obtuse H" pattern 74 mates with an aperture 76 formed through the wall of housing 12. The slot 72 and the other leg of the groove 74 intersect a vertical groove 78 formed partway into the housing. A passageway 80 connects the groove 78 with a mating passageway 82 formed in the base 10. Passageway 82 connects passageway 80 and groove 78 with a vacuum connector 84 mounted to the base 10. A front view of housing 12, FIG. 12, shows in greater detail the configuration and relationship of aperture 76, groove 78 and passageway 80.

Figure 13:
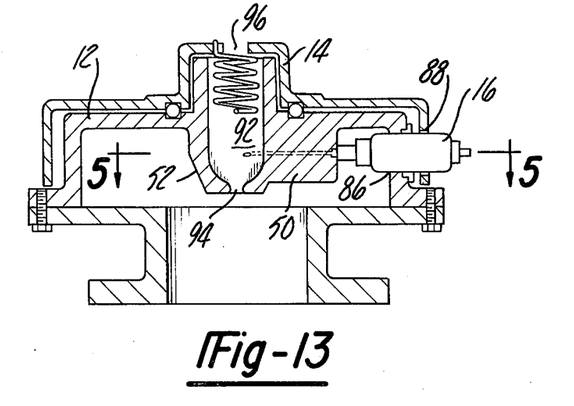
FIG. 13 is a cross sectional view of the carburetor along the cross section designated 13—13.
Figure 14:
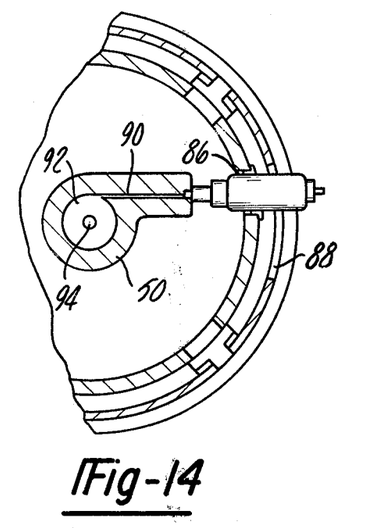
FIG. 14 is a cross sectional view of the carburetor along the cross section designated 5—5.

The details of the air assisted atomizer is shown on FIGS. 13 and 14. The fuel control valve 16 is mounted through an aperture 84 in the skirt 60 circumscribing the housing and a mating aperture 86 in the housing 12. A fuel passageway 90 connects the output of the fuel control valve 16 with a swirl chamber 92 tangential to its internal surface so that the fuel ejected from the fuel control valve 16 will be caused to swirl therein. The swirl chamber 92 has an inverted bell-shaped configuration terminating at its lower end in a control aperture 94. The rotary cage 14 has an aperture 96 providing an air path from outside the carburetor through cavity 56 to the swirl chamber 92. The aperture 96 may be disposed concentric to cavity 56, swirl chamber 92 and the aperture 94, as shown, or may be disposed off-axis to permit the air flowing therethrough to be caused to swirl as it passes therethrough. The position of the aperture 96 with respect to the axis of the swirl chamber, is determinative of the angular dispersion of the atomized fuel as it exits aperture 94.

Figure 15:
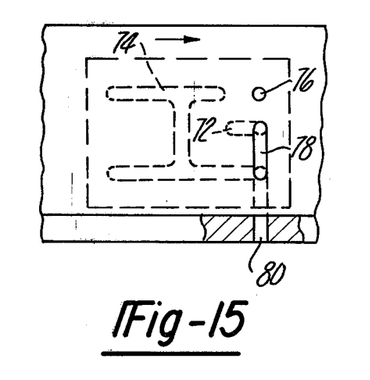
FIG. 15 is a side view of the housing showing the position of the valve member in phantom.
Figure 16:
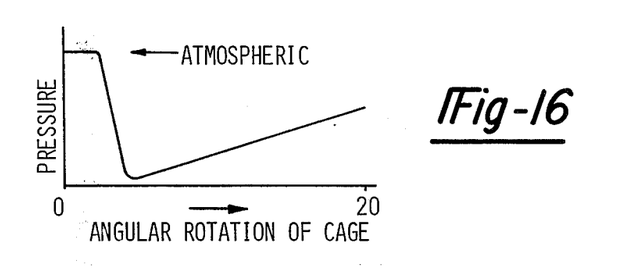
FIG. 16 is a graph showing the output signal of the vacuum valve.

The operation of the carburetor is explained with reference to FIGS. 1–15 and the graphs shown on FIG. 16. When the engine is running and the accelerator pedal 22 is in the idle position, the rotary cage 14 is rotated to its extreme clockwise position, as shown on FIG. 2, by the force exerted by spring 58, as determined by the position of cable 26. It is recognized that a temperature responsive fast idle stop, as taught by the prior art, may be included to hold the throttle partially open as a function of engine temperature when the engine is cold, providing the normal cold engine "fast idle". When the engine is warm and the accelerator pedal is in the idle position, the shutters 34 completely cover the apertures 36 or leave only a small opening, as previously indicated, and the idle air flow through the carburetor is primarily controlled by the air flow through orifice 92 of the air assisted atomizer. Fuel is supplied to the carburetor by means of the fuel control valve 16 in response to the control unit 18. In the preferred embodiment, the control unit 18 is an electronic control unit generating pulse signals indicative of the engine's fuel requirements, as taught by the prior art. Because the fuel is injected tangential to the inner surface of the swirl chamber, it is caused to swirl therein and spreads out into a thin film along the surfaces of the swirl chamber and bell-shaped surfaces of the orifice 92. This thin film of fuel is vaporized by the air passing through the swirl chamber forming a well vaporized air fuel mixture. In this counterclockwise position of cage 14, the relative position of the slots 72 and "H pattern" groove 74 of valves 38 and 40, with respect to the aperture 76 and the groove 78 in the housing 12, are illustrated on FIG. 15. The slot 72 and the groove 74 are shown in phantom on FIG. 15 while the aperture 76 and the groove 78 are shown as solid lines. In this position, air at atmospheric pressure is conducted to the vacuum connector 84 through the apertures 72 in the valves 38 and 40, groove 78 and passageways 80 and 82. With the throttle closed, the pressure signal at the vacuum connector 84 is, therefore, atmospheric pressure, as shown on FIG. 16. As the operator depresses the accelerator pedal 22, the rotary cage 14 rotates in a counterclockwise direction, as indicated by the arrow designated A in FIG. 2. As the cage 14 rotates, the shutters 34 start to uncover the apertures 36 admitting more air into the carburetor in proportion to the angular rotation of the cage. Valve members 38 and 34 also move with the rotation of cage 14. However, for the initial movement, the groove 78 remains connected to slot 72 and the vacuum signal at the vacuum connector 84 remains at atmospheric pressure. However, after the cage has rotated through a predetermined angle, the slot 72 moves beyond groove 78 and the shorter leg of the "obtuse H" configuration intercepts aperture 76 and the manifold pressure is conducted to the vacuum connector 84 through the H section of groove 74 and groove 78. The angle at which the vacuum signal from inside the manifold is applied to the vacuum connector 84 is controlled by the length of the slot 72 and the shorter leg of groove 74. The length of slot 72 and short leg of the H section 74 on the valve members 38 and 40 are selected to accommodate the EGR signals and the spark advance signals respectively for each engine type.

Once the short leg of groove 74 intercepts the aperture 76, the vacuum signal at the output of the vacuum connector is the pressure inside the carburetor which is approximately the same as pressure in the engine's intake manifold. The configuration of valve members 38 and 40 shown above have the advantage that the spark advance and EGR vacuum signal characteristics can be more precisely tailored to the engine and can be adjusted for different engines by simply changing the valve members to match the dynamic characteristics of the new engine. Thereby, a single carburetor can be made to meet the requirements of a variety of engines.

Figure 17:
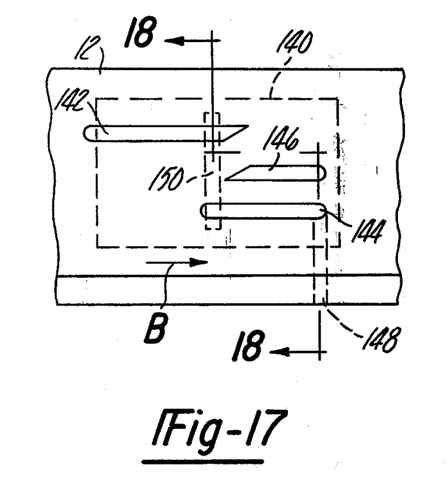
FIG. 17 is a side view of the housing showing an alternate embodiment of the vacuum signal valve.
Figure 18:
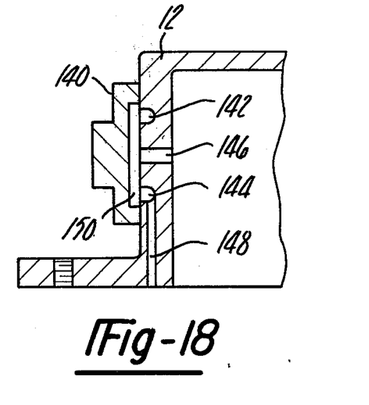
FIG. 18 is a cross sectional view of the housing and valve member of the alternate embodiment of FIG. 17.

An alternate embodiment of the valve members 38 and 40 are shown on FIGS. 17 and 18. In this configuration, the housing 12 has two grooves 142 and 144 formed on its external surface and a slot 146 machined therethrough. A passageway 148 connects groove 144 to the bottom of the housing 12 similar to passageway 80 shown on FIG. 3 of the previously discussed configuration. The alternate valve configuration 140 shown in phantom in FIG. 17 and in cross section in FIG. 18 has a groove 150 spanning grooves 142 and 144 and the slot 146. It is noted that groove 142 formed in the housing 12 extends beyond the position of the valve member with the accelerator pedal 22 in the idle position so that one end is continuously exposed to atmospheric pressure at all times. In the idle position, atmospheric pressure from groove 142 is communicated to groove 144 and passageway 148 by means of the groove 150 in the valve member. As the cage rotates in a counterclockwise direction, the valve member 140 moves to the right in the direction shown by arrow B towards the tapered sections of groove 142 and slot 146. The combined signal in the region of the tapered sections gradually change from atmospheric pressure to the pressure inside the carburetor, as the groove 150 passes from left to right. At a predetermined angle determined by the length of groove 142, the pressure communicated to groove 144 by groove 150 becomes entirely dependent on the pressure inside the carburetor.

Figure 19:
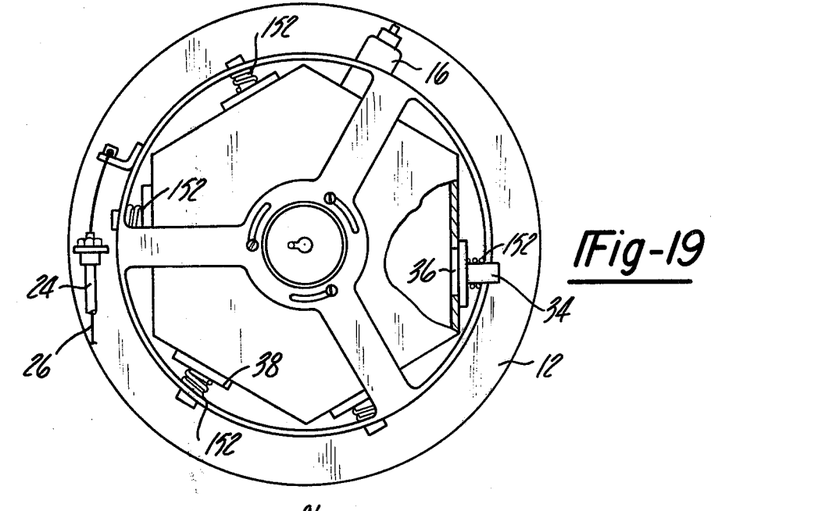
FIG. 19 is a top view of the carburetor showing an alternate configuration of the housing having a flat side.

In order to reduce manufacturing costs it may be desirable to have the external surfaces of the housing 12 adjacent to the air input port, valve members or both flat, rather than curved, as shown on FIGS. 1 and 2. The basic concepts taught with reference to the preferred embodiment are still applicable to a housing having flat surfaces, as illustrated in FIG. 19. In this embodiment, the housing 12 is hexagonal in shape rather than circular, as in the preferred embodiment, and represents an extreme case. Comparable elements in FIG.

19 have the same identifying indicia as FIGS. 1 and 2. It is obvious to one skilled in the art that the curved surfaces of the shutters 34 and valve members 38 and 40 shown on FIGS. 1 and 2 would be flat in FIG. 19 to mate with the flat surfaces on the housing and that the wave spring 42 would be replaced with a coil spring 152 having a longer working distance. Rotation of cage 14 would cause the shutters 34 and valve members 38 and 40 to slide across the flat surfaces similar to the way they would slide across the curved surfaces of FIGS. 1 and 2.

Figure 20:
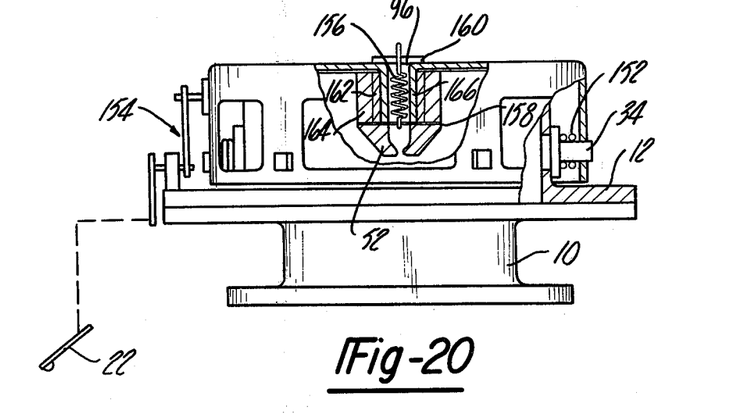
FIG. 20 is a side view of the carburetor showing an alternate embodiment in which the cage is linearly displaced.

Further, the cage 14 need not be a rotary cage, but rather could be vertically displaced, as illustrated on FIG. 20. In this embodiment, the cage would move up and down in response to movement of the operator's accelerator pedal by two or more levers, cams, or other similar devices generally designated, as lever assembly 154 lifting the cage at predetermined locations against the force of a resilient member, such as coil spring 156 producing a force in the direction closing the air inlet ports. The spring 156 may be attached directly to the housing or to a pin 158 inserted in boss 52 and attached to the cage by means of pin 160 spanning the aperture 96. A nylon bushing 162 or other plastic material having a surface with a low co-efficient of friction may be inserted between the concentric guides 164 and 166 of the housing and cage, respectively, to permit relatively frictionless motion in a vertical direction. In this embodiment, the surfaces adjacent to the shutters and valves may be curved, as shown on FIG. 2, with reference to the preferred embodiment or may be flat, as shown in the embodiment illustrated on FIG. 19. The operation of the two alternate embodiments of FIGS. 19 and 20 are basically the same as discussed relative to the preferred embodiment.

Although the invention has been described with reference to particular configurations with respect to the apertures, valve mechanism, it is intended that the invention not be limited to those configurations shown. It is known that in other aperture, cage and valve configurations may be designed by those skilled in the art without departing from the spirit of the invention.

What is claimed is:

1. A carburetor comprising:
 an air control valve having an axis of symmetry, a plurality of inlet ports radially disposed about said axis admitting air into said valve in a radial direction towards the axis of symmetry, means for controlling the effective open area of said inlet ports, and an outlet port disposed concentric with said axis; and
 fuel delivery means for delivering a controlled quantity of atomized fuel at a location inside said air control valve intermediate said inlet ports and said outlet port and concentric with said axis symmetry.

2. The carburetor of claim 1 wherein said air control valve further includes at least one vacuum signal valve means for generating predetermined signals in response to said means for controlling the open area of said inlet ports.

3. The carburetor of claim 2 wherein said air control valve comprises:
 a housing enclosing an inner chamber symmetrical about said axis, and having said inlet and outlet ports;
 a cage movable from a first position to a second position attached to said housing and circumscribing said inlet ports, said cage having a plurality of shutter members, equal in number to said inlet ports, resiliently mounted to said cage between said cage and said housing, said shutter members covering each of said inlet ports when said cage is in said first position and not covering said inlet ports when said cage is in said second position wherein said cage and shutter members comprise said means for controlling.

4. The carburetor of claim 3 wherein said housing further includes at least one valve aperture disposed through an external wall thereof and at least one valve output passageway, said vacuum valve means includes a valve shutter member resiliently mounted to said cage between said cage and said housing, said valve shutter member covering said at least one valve aperture for all positions of said cage between said first and second positions and having means for providing a connecting passageway from said valve aperture to said valve output passageway for predetermined positions of said cage, wherein the signals generated in the valve outlet passageway with the cage in said predetermined positions is a pressure signal indicative of the pressure in the inner chamber of said housing.

5. The carebutor of claim 4 wherein said valve shutter member further includes means for providing a passageway connecting said valve outlet passageway with ambient pressure outside said housing for all positions other than said predetermined positions of said cage.

6. The carburetor of claim 5 wherein said included means for providing provides a passageway connecting said valve output passageway with ambient air during a first predetermined interval as said cage moves from said first position to said second position and said means for providing provides a passageway connecting said valve output passageway with said valve inlet aperture for the remainder of the interval of movement of the cage between said first and second positions.

7. The carburetor of claim 5 wherein the external wall of said housing about said axis is a cylinder, said cage is a rotary cage adapted to rotate about said axis.

8. The carburetor of claim 5 wherein said fuel delivery means is an air assisted fuel atomizer comprising:
 an atomizer housing disposed in said internal chamber and attached to said housing opposite said outlet port;
 an air passageway conducting air from outside said housing to said swirl chamber;
 an atomizer exit port disposed concentric to said axis connecting said swirl chamber to said internal chamber; and
 a fuel passageway having an inlet port for receiving pressurized fuel from an external source and an outlet port intercepting said swirl chamber tangential to its inner surface whereby the fuel entering the swirl chamber from said fuel passageway will form a fuel ring which is carried away into the inner chamber through the exit port by the air flowing through said air passageway.

9. The carburetor of claim 8 wherein said air assisted atomizer further includes a fuel control valve having a fuel outlet connected to the inlet port of said fuel passageway and fuel inlet for receiving fuel from said external source.

10. In combination with an internal combustion engine having an intake manifold, a pressurized fuel source, and an accelerator control for providing a signal indicative of an operator's command, an improved carburetor for supplying an air/fuel mixture to the intake manifold comprising:

an air control valve means fixedly attached to said intake manifold for controlling the air flow to the engine, said air control valve having an axis of symmetry, an outlet port concentric with said axis conducting the air flowing through said air control valve means to said intake manifold, a plurality of inlet ports radially disposed about said axis admitting air into said control valve means in a radial direction towards said outlet port and means responsive to the signals generated by said accelerator control for controlling the effective open area of said inlet ports; and fuel delivery means receiving fuel from the pressurized fuel source for delivering a controlled quantity of atomized fuel inside said air control valve means intermediate said inlet ports and said outlet port.

11. The combination of claim 10 wherein said air control valve further includes at least one vacuum signal valve means for generating predetermined signals in response to said means for controlling the open area of said inlet ports.

12. The carburetor of claim 11 wherein said air control valve comprises:

a housing having walls enclosing an inner chamber symmetrical about said axis, and having said inlet and outlet ports;

a cage movable from a first position to a second position attached to said housing and circumscribing said inlet ports, said cage having a plurality of shutter members, equal in number to said inlet ports, resiliently mounted to said cage between said cage and said housing, said shutter members covering each of said inlet ports when said cage in said first position and not covering said inlet ports when said cage is in said second position wherein said cage and shutter members comprise said means for controlling.

13. The combination of claim 12 wherein said housing further includes at least one valve aperture disposed through an external wall thereof and at least one valve output passageway, said vacuum valve means includes a valve shutter member resiliently mounted to said cage between said cage and said housing, said valve shutter member covering said at least one valve aperture for all positions of said cage between said first and second positions and having means for providing a connecting passageway from said valve aperture to said valve output passageway for predetermined positions of said cage, wherein the signals generated in the valve outlet passageway with the cage in said predetermined positions is a pressure signal indicative of the pressure in the inner chamber of said housing.

14. The combination of claim 13 wherein said valve shutter member further includes means for providing a passageway connecting said valve outlet passageway with ambient pressure outside said housing for other predetermined positions of said cage.

15. The combination of claim 14 wherein said included means for providing provides a passageway connecting said valve output passageway with ambient air during a first predetermined interval as said cage moves from said first position to said second position and said means for providing provides a passageway connecting said valve output passageway with said valve inlet aperture for the remainder of the interval of movement of the cage between said first and second positions.

16. The combination of claim 15 wherein said engine further includes a vacuum actuated spark advance mechanism, said at least one vacuum signal valve means is a spark advance vacuum signal valve providing vacuum signals to said spark advance mechanism.

17. The combination of claim 15 wherein said engine further includes a vacuum actuated exhaust gas recirculation valve, said at least one vacuum signal valve means is an exhaust gas recirculation vacuum signal providing vacuum signals to said exhaust gas recirculator valve.

18. The combination of claim 15 wherein said engine further includes a vacuum actuated spark advance mechanism and an exhaust gas recirculator valve, said carburetor includes two vacuum signal valve means, one of said vacuum signal valve means generating vacuum signals for actuating said spark advance mechanism and the other generating vacuum signals for actuating said exhaust gas recirculation valve.

19. The carburetor of claim 14 wherein the external wall of said housing about said axis is a cylinder, said cage is a rotary cage adapted to rotate about said axis.

20. The combination of claim 14 wherein said fuel delivery means is an air assisted fuel atomizer comprising:

an atomizer housing disposed in said internal chamber and attached to said housing opposite said outlet port;

a fuel swirl chamber disposed in said atomizer housing concentric with said axis;

an air passageway conducting air from outside said housing to said swirl chamber;

an atomizer exit port disposed concentric to said axis connecting said swirl chamber to said internal chamber; and a fuel passageway having an inlet port for receiving pressurized fuel from said pressurized fuel source and an outlet port intercepting said swirl chamber tangential to its inner surface whereby the fuel entering the swirl chamber from said fuel passageway will form a fuel ring which is carried away into said inner chamber through said exit port by the air flowing through said air passageway.

21. The combination of claim 20 wherein said engine further includes an electronic control unit generating electrical signals indicative of the engine's fuel requirement in response to sensors generating signals indicative of the engine's operating conditions, said fuel delivery means further includes an electrically actuated fuel control valve for delivering fuel to said air assisted atomizer in response to the signals generated by said electronic control unit, said fuel control valve having a fuel outlet port connected to the inlet port of said fuel passageway and a fuel inlet port connected to said pressurized fuel source.

22. A carburetor comprising:

a housing enclosing an inner chamber having an axis of symmetry, said housing admitting air into said inner chamber in a radial direction towards said axis of symmetry having a plurality of air inlet ports radially disposed through the walls of said housing, an outlet port disposed concentric with said axis of symmetry, at least one valve aperture disposed through the wall of said housing intermediate two adjacent air inlet ports, and at least one valve outlet passageway disposed proximate said valve aperture;

A cage movable from a first position to a second position, attached to said housing and circumscribing said air inlet ports and said at least one valve aperture, said cage having a plurality of shutter members equal in number to said inlet ports, resiliently mounted to said cage, and covering each of said inlet ports when said cage is in said first position and not covering said inlet ports when said cage is in said second position, and at least one valve shutter resiliently mounted to said cage between said cage and said housing over the location of said valve aperture and valve outlet passageway, said valve shutter having a face adjacent to the housing conforming to the contour of housing and an air aperture passing therethrough connecting to the valve outlet passageway for a first predetermined interval of movement of said cage between said first and second positions and wherein said valve shutter further includes a vacuum signal passageway formed along said face connecting said valve aperture with said valve outlet passageway for a second interval of movement of said cage between said first and second positions; and fuel delivery means for delivering a controlled quantity of atomized fuel inside said housing at a location intermediate said inlet ports and said outlet port concentric with said axis of symmetry.

23. The carburetor of claim 22 wherein said cage is a rotary cage adapted to rotate about said axis of symmetry.

24. The carburetor of claim 23 wherein said fuel delivery means is an air assisted fuel atomizer comprising:
an atomizer housing disposed in said housing opposite said outlet port;
a fuel swirl chamber disposed in said atomizer housing concentric with said axis;
an air passageway conducting air from outside said housing to said swirl chamber;
an atomizer exit port disposed concentric to said axis connecting said swirl chamber to said internal chamber; and
a fuel passageway having an inlet port for receiving pressurized fuel from an external source and an outlet port intercepting swirl chamber tangential to its inner surface whereby the fuel entering the swirl chamber from said fuel passageway will form a fuel ring which is carried away into the inner chamber through the exit port by the air flowing through said air passageway.

25. The carburetor of claim 24 wherein said air assisted fuel atomizer further includes an electrically controlled fuel injector valve for injecting fuel into said fuel passageway in response to electrical signals.

* * * * *